(12) United States Patent
Dam et al.

(10) Patent No.: US 6,496,551 B1
(45) Date of Patent: Dec. 17, 2002

(54) METHOD AND DEVICE IN A RADIO COMMUNICATIONS SYSTEM

(75) Inventors: Henrik Dam, Sundbyberg (SE); Sven Ekemark, Storvreta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/250,414

(22) Filed: Feb. 16, 1999

(30) Foreign Application Priority Data

Feb. 16, 1998 (SE) ............................................... 9800136

(51) Int. Cl.[7] .......................... H04B 7/005; H04B 7/08; H04L 1/06; H04L 25/04
(52) U.S. Cl. .......................... 375/347; 375/267; 455/101
(58) Field of Search .............................. 375/347, 267, 375/260, 348; 455/7, 132, 11.1, 101, 121, 137, 296; 370/210, 230; 371/49.1

(56) References Cited

U.S. PATENT DOCUMENTS

| | | | |
|---|---|---|---|
| 5,390,166 A | | 2/1995 | Rohani et al. |
| 5,568,513 A | | 10/1996 | Croft et al. |
| 5,991,331 A | * | 11/1999 | Chennakeshu et al. ..... 375/202 |
| 5,995,559 A | | 11/1999 | Hedberg |
| 6,147,985 A | * | 11/2000 | Bar-David et al. .......... 370/347 |

FOREIGN PATENT DOCUMENTS

| | | |
|---|---|---|
| DE | 19509601 | 9/1996 |
| EP | 430481 | 6/1991 |
| EP | 541225 | 5/1993 |
| EP | 782275 | 12/1996 |
| EP | 793360 | 9/1997 |

\* cited by examiner

*Primary Examiner*—Chi Pham
*Assistant Examiner*—Dung X. Nguyen
(74) *Attorney, Agent, or Firm*—Burns, Doane, Swecker & Mathis, L.L.P.

(57) ABSTRACT

The reception of repeated bursts of identical information in a radio communications system is made faster and more secure by a receiving unit including a device for receiving and processing incoming signals from a transmitting unit in the same radio communications system, a buffer for temporarily storing repeated bursts, and a device for equalizing and combining at least two of the repeated bursts. The receiving unit may also include (for diversity) a duplicated receiving device for receiving signals from two different antennas and an equalizing and combining device for equalizing and combining the signals received by the duplicated receiving device. The receiving unit may be located in a radio base station or in a radio terminal in a radio communications system. The repeated bursts are received and stored in buffers, before the information of at least two repeated bursts is equalized and combined to form a more reliable signal.

15 Claims, 5 Drawing Sheets

METHOD AND DEVICE IN A RADIO COMMUNICATIONS SYSTEM

TECHNICAL FIELD

The present invention relates to radio communications systems, and in particular to the handover procedure in cellular mobile radio systems.

BACKGROUND

In a cellular mobile telecommunications network, a mobile unit communicates with a base station covering the area, or cell, in which the mobile unit is found. Around this cell, there are other cells, covered by other base stations. In some situations, a mobile unit needs to transmit signals to a base station, or a base station to a mobile station, in the form of repeated bursts each burst comprising the same information.. Usually, this is done to increase the probability of the base station, or the mobile unit, successfully receiving and interpreting the signal.

In a Global System for Mobile Communication (GSM), the most common situations in which such repeated bursts are transmitted are handover, replies to polling requests and certain acknowledgement signalling when packet switching is used. These situations will be described in the following.

When a mobile unit having an established connection to a base station moves from the cell of this base station to another cell, the base station in the new cell should take over the connection from the first base station. This procedure is called handover. To make the handover procedure faster, the mobile unit constantly monitors the current and other cells and reports measurement data for these cells to the network. The base station controller decides if the mobile unit should change its connection from the current base station to another base station. If this is found to be the case, the mobile unit sends a number of access messages to the new base station. When the new base station acknowledges that an access message has been received, the new connection can be established and the previous one disconnected. The Fast Associated Control Channel (FACCH) is a logical control channel used in GSM for, among other things, signalling in connection with handover.

Handover is a critical phase of a connection as it is often performed when a mobile unit is far away from base stations, that is, when the signal properties are poor. Furthermore, according to some standards, for example, GSM, some signalling is required on the speech/data channel, involving a break in the speech or data. The handover procedure therefore should be made as fast and reliable as possible and have a high performance with respect to noise and interference.

When packet switching is used, for example according to the Global Packet Radio Services (GPRS) standard in GSM, a polling request is transmitted from a base station to a mobile unit to check if the mobile unit is present. The mobile unit responds by transmitting four identical bursts, that are used by the base station to determine the signal strength and other parameters needed when communicating with the mobile unit.

Also, when packet switching is used, an acknowledgement signal is transmitted from the base station when a message packet has been successfully received. This acknowledgement signal is repeated until it has been successfully received by the mobile unit. When the mobile unit receives such an acknowledgement signal, it therefore responds by transmitting a signal acknowledging that the acknowledgement signal has been received. This "acknowledgement of acknowledgement" signal comprises four bursts, each burst comprising the same information.

In all of these situations of repeated bursts being transmitted, it is desirable that the information is successfully received and interpreted as quickly as possible, as the transmission of these repeated bursts inhibits other communication.

These situations are particularly critical when antennas are used that do not receive information from all directions at the same time, especially if the position of the mobile unit is unknown. The signal strength then varies with time in dependence of the directions in which the antenna is receiving at a given time.

Repeated bursts of information are also transmitted from the base station to the mobile unit, for example when ordering handover. Also, system information on the Broadcast Control Channel (BCCH) and synchronization information on the Frequency Correction Channel (FCCH) and the Synchronization Channel (SCH) are transmitted in the form of repeated bursts.

A solution for making the reception of a signal more reliable is disclosed, for example, in U.S. Pat. No. 5,390,166. Here each information burst is transmitted simultaneously from two different transmitters using two different carrier frequencies, and the two bursts are combined at the receiving end. This solution requires two transmitters transmitting the same information and thus is not suitable for a cellular communication system having a limited frequency spectrum.

In Total Access Communications Systems (TACS) and Advanced Mobile Phone Service (AMPS) systems, the reliability of the reception of information is achieved by transmitting a word, or block of data, which has first been encoded, for example, five or eleven times. U.S. Pat. No. 5,995,559, describes how the five uplink repetitions of a word are received and decoded. If one of the repetitions is successfully decoded, the remaining repetitions are ignored. If none of the repetitions can be successfully decoded, a bit-wise majority vote of the five repetitions is taken and the voting result is decoded. The bit values determined in this way are deemed to constitute the received word, which is passed to a decoder.

U.S. Pat. No. 5,568,513 describes how the repetition of words can be exploited in the AMPS and TACS systems. This is for instance performed by having a set of windows selecting a resulting word from the parts of each repeated word having sufficient quality. In another aspect of U.S. Pat. No. 5,568,513 the resulting decoded word comes from a so-called majority voting of the repeated decoded words. U.S. Pat. No. 5,568,513 is strictly based on combinations or selections of decoded bits, that is, on combination on a digital level.

SUMMARY

It is an object of the present invention to make the reception of information transmitted as repeated bursts in a radio communications system faster and more reliable.

It is another object of the present invention to enable a fast and reliable handover procedure in cellular communications networks.

These objects are achieved according to the present invention by a receiving device for use in a radio communications system in which certain information is received in the form of repeated bursts comprising the same information, said receiving device comprising means for receiving and processing incoming signals from a transmitting device in the same radio communications system, said receiving device comprising means for receiving at least two and temporarily storing at least one received repeated burst, before they are decoded, and equalizing and combining means for equalizing and combining said received repeated bursts.

The receiving device can also comprise duplicated receiving means for receiving signals from a transmitter in the radio communications system and combining means for combining the signals received by the duplicated receiving means.

The receiving device can be a part of a radio base station or a terminal in a radio communications system.

A method of receiving information being transmitted from a transmitting unit to a receiving unit in a radio communications system in the form of repeated bursts comprising the same information is also disclosed, said method comprising the following steps:

receiving and temporarily storing said repeated bursts;

equalizing and combining the information of at least two repeated bursts before decoding;

interpreting the equalized and combined information in the same way as the information of a single burst would be interpreted.

In a preferred embodiment, bitwise combination is used, and more specifically a Maximum Ratio Combining algorithm.

Weights, can be assigned, bit-wise or burst-wise, to the received signal in dependence of the signal quality.

The invention offers the following advantages:

The reliability of the information received in the form of repeated bursts can be increased without duplication of antennas or other equipment.

The time needed to receive such information successfully can be reduced without duplication of antennas or other equipment.

The disadvantages of antennas that do not receive from all directions at the same time are reduced.

BRIEF DESCRIPTION OF THE DRAWINGS

The invention will be described in more detail in the following, with particular reference to the drawings, in which.

DETAILED DESCRIPTION

Figure 1:
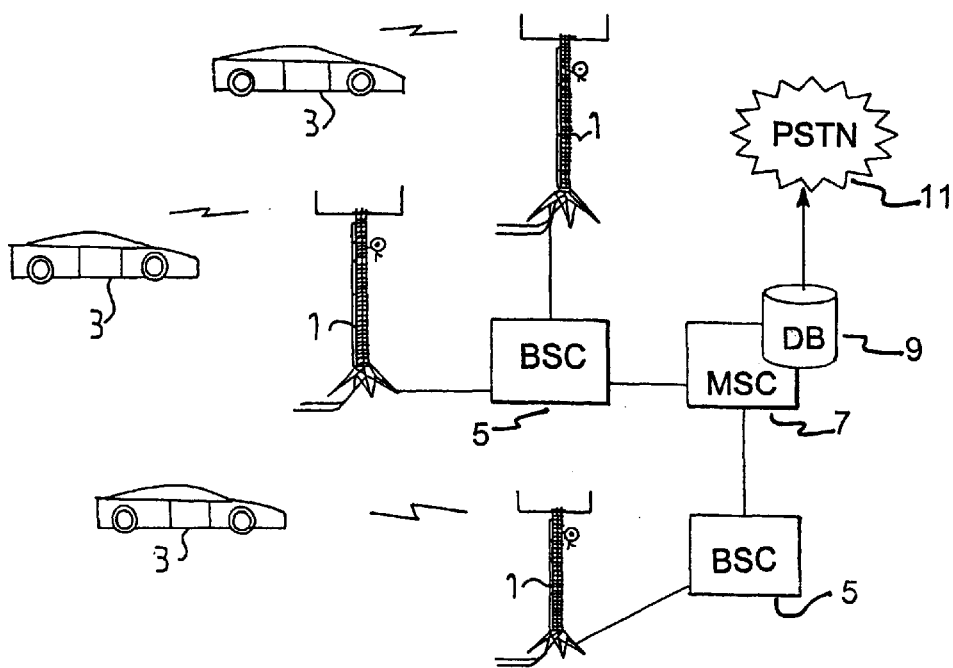
FIG. 1 is a schematic view of the components of a mobile telecommunications network.

FIG. 1 shows a mobile telecommunications system comprising a number of base stations 1. Each base station 1 covers a geographic area called a cell (not shown) and can handle communication with a number of mobile units 3. One or more base stations 1 are connected to a Base Station Controller (BSC) 5. A number of BSCs 5 are connected to an exchange called a Mobile Services Switching Centre (MSC) 7. One or more databases 9 are normally found in connection with the MSC 7, but are not important to the invention and will therefore not be discussed in any detail here. The MSC 7 is usually connected to a Public Services Telephone Network PSTN 11, to enable communication between units in the mobile telecommunications system and units in other networks.

Signalling in a GSM System

Figures 3A, 3B:
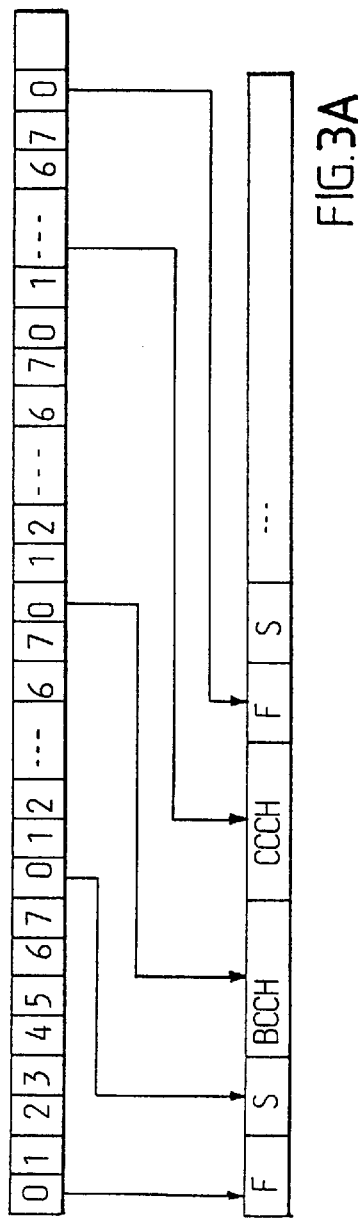
FIGS. 3A and 3B show the principles for the downlink common control signalling according to the GSM protocols.

In a Time Division Multiple Access (TDMA) system, each carrier frequency is divided into a number of time slots. One type of TDMA system is the GSM system. In GSM, as shown in FIG. 3A, there are eight time slots, TS0, TS1, . . . , TS7. These eight time slots make up one TDMA frame, as shown in FIG. 3A. 26 or 51 frames make up one multiframe. The same time slot in a sequence of frames, e.g. time slot 3 in all the frames, is referred to as a physical channel.

One physical channel may be used, at different times, for transmission of different logical channels. Logical channels may be either traffic channels carrying payload or control channels carrying different kinds of control information. One telephone call uses one physical channel for transmission in each direction for the duration of the call.

The information on the control channels is carried in bursts. A burst comprises the information in the same time slot in a sequence of frames of predefined length. The different types of bursts are shown, somewhat simplified, in FIGS. 2A–2E.

Figure 2A:
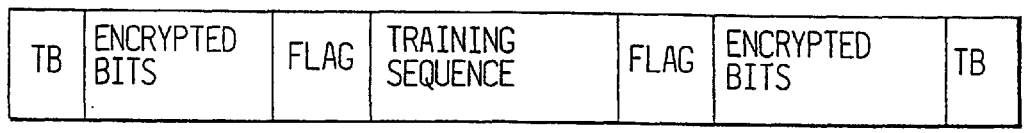
FIGS. 2A–2E show, somewhat simplified, the different air interface signal formats used in a GSM system.

FIG. 2A shows the normal burst, which is used to carry information on traffic channels and on certain control channels, such as the Broadcast Control Channel (BCCH) and the Paging Channel (PCH).

The first three bits are tail bits TB, which signify a start point. The following bit sequence carries encrypted data or speech. Then follows a flag, a Training Sequence Code (TSC), that is, a specified bit pattern used by the equalizer, another flag and another sequence of encrypted data or speech. The last three bits are again tail bits TB, this time signifying a stop point. The tail bits are always set to 0, 0, 0.

Figure 2B:

FIG. 2B shows the frequency collection burst, which is used for frequency synchronization of the mobile terminal. The frequency correction burst consists of 148 bits all set to zero, involving a constant frequency during the whole burst.

Figure 2C:
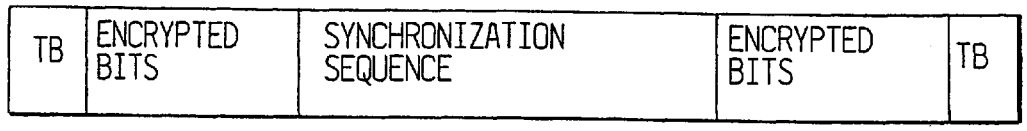

FIG. 2C shows the synchronization burst, which is used for the time synchronization of the mobile terminal. It contains three tail bits TB, a sequence of encrypted bits, a long synchronization sequence another sequence of encrypted bits and three more tail bits. The encrypted sequences carry the information of the TDMA Frame Number (FN) and Base Station Identity Code (BSIC).

Figure 2D:
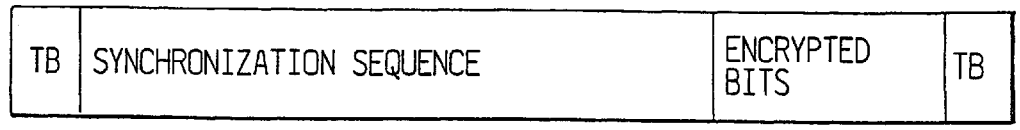

FIG. 2D shows the access burst, which is used for uplink signalling at random access and handover access. The access burst comprises eight extended tail bits TB followed by a synchronization sequence, a sequence of encrypted bits and three more tail bits TB.

Figure 2E:
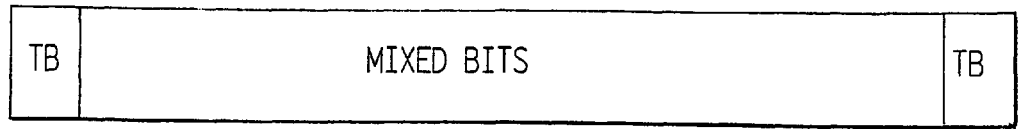

FIG. 2E shows the dummy burst, which is transmitted on the BCCH carrier frequency when no other information is to be transmitted on this frequency. The dummy burst comprises three tail bits followed by a sequence of mixed bits and three tail bits.

The logical channels relevant to the invention are as follows:

The BCCH and the PCH are transmitted as normal bursts, as shown in FIG. 2A. BCCH comprises general information about the cell, and PCH is used to page a mobile terminal.

In idle mode, the downlink transmission, that is, from the base station to the mobile terminal, normally comprises normal bursts (BCCH and PCH), frequency correction bursts (FCCH), synchronization bursts (SCH) and dummy bursts.

A mobile terminal is normally only capable of transmitting normal bursts and access bursts.

FIG. 3A shows the principles for the downlink common control signalling that takes place in time slot 0 of the BCCH carrier according to the GSM protocols. The physical channel defined by this time slot comprises the following channels: FCCH, SCH, BCCH, as defined above, and the Common Control Channel (CCCH), which comprises the PCH.

FIG. 3B shows a typical mapping of the common control channels FCCH, SCH, BCCH and CCCH in a cell in GSM, as an example of a TDMA system. An FCCH frame is followed by an SCH frame, four BCCH frames and four CCCH frames. Then, the following pattern occurs four times: One FCCH frame, one SCH frame, four BCCH frames and four CCCH frames. The sequence ends with an idle frame.

The sequence of common control signalling frames is repeated continuously. The information transmitted on the BCCH and CCCH is organized in messages each of which is mapped onto such a block of four BCCH or CCCH frames, respectively. Some of these messages, in particular on the BCCH are repeated with identical contents at predetermined intervals. In prior art systems these messages, and the bursts used to carry them, are received and interpreted one by one. According to the invention, identical repeated bursts carrying this kind of information are stored in a buffer and combined.

Figure 4A:
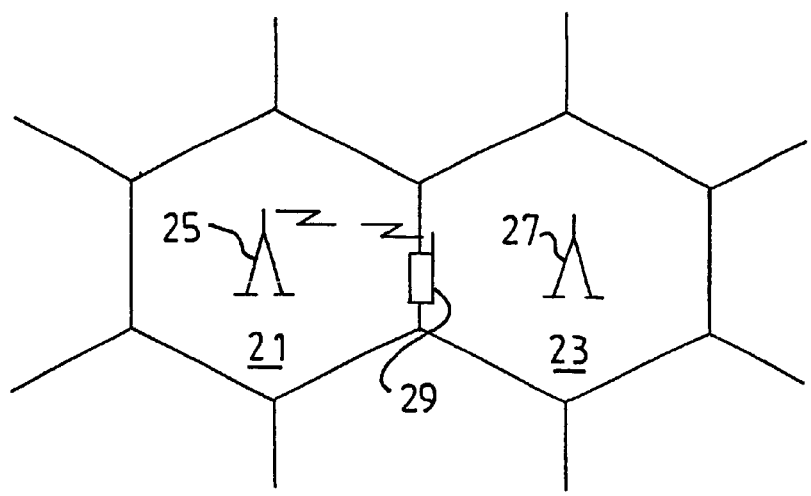
FIG. 4A is a schematic view of a mobile telecommunications system comprising a number of cells.

FIG. 4A is a schematic view of two cells 21, 23 in a mobile telecommunications network comprising a number of surrounding cells as indicated. In each cell there is a base station 25 and 27, respectively, which communicates with mobile units found in this cell. In FIG. 4A, a mobile unit 29 is shown on the border between the two cells 21, 23, to indicate that it is about to move from the first cell 21 into the second cell 23. It is currently connected to the base station 25 of the first cell 21, and must establish a new connection to the base station 27 of the second cell 23.

Figure 4B:
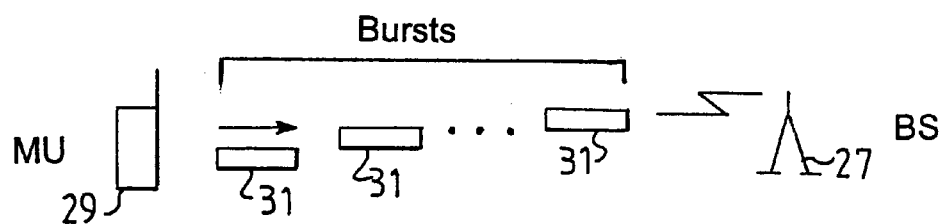
FIG. 4B is a schematic representation of the signalling between a mobile unit and a base station in a situation relevant to the invention.

FIG. 4B shows the signalling from the mobile unit 29 to the second base station 27 of FIG. 2D in this situation. A number of access bursts 31 are transmitted from the mobile unit 29 to the second base station 27 until an access burst has been successfully received and interpreted at this base station 27.

Figure 5:
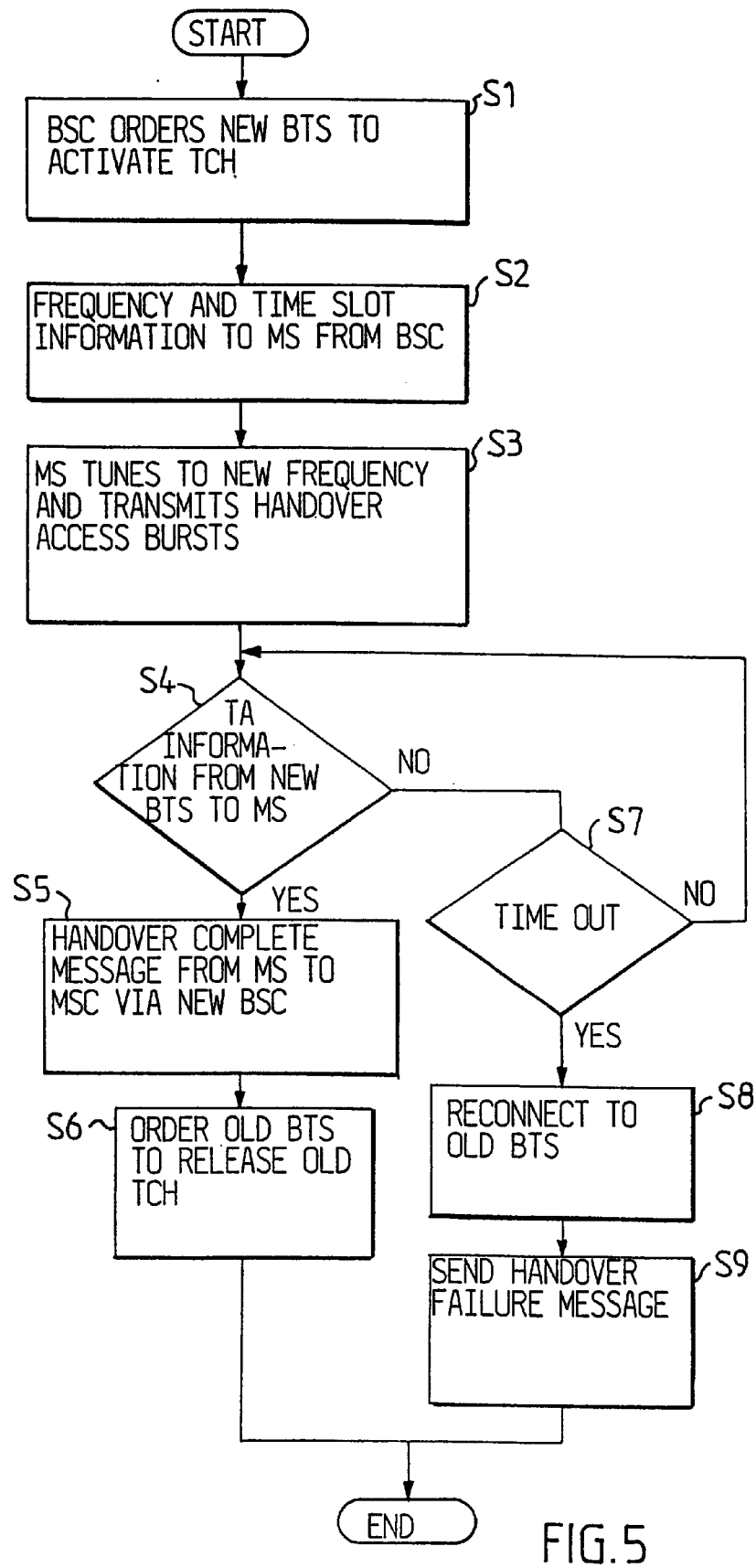
FIG. 5 is a flow chart of a handover performed in a way known in the art.

FIG. 5 is a flow chart of the events that take place at handover between two base stations connected to the same BSC. The handover procedure between two base stations connected to different BSCs, which may be connected to different MSCs, are analogous but slightly more complicated than the procedure shown as they involve more levels. The steps relevant to the invention are the same. Therefore, the other two procedures will not be discussed in any detail.

Step S1: The BSC orders the new BTS to activate a traffic channel TCH.

Step S2: The BSC sends a message to the mobile unit via the old BTS comprising information about the frequency and time slot to change to and the output power to be used. This information is sent over the FACCH.

Step S3: The mobile unit tunes to the new frequency and transmits handover access bursts to the new base station. Each handover burst comprises 87 bits, but only 8 bits of information, and is transmitted on the FACCH.

A maximum of approximately 40 handover access bursts are transmitted. This is controlled by a timer. When the new base station has successfully received at least one handover access burst it sends Time Advance (TA) information to the mobile unit on the FACCH.

Step S4: Has the mobile unit received TA information? If yes, go to step S5, if no, go to step S7.

Step S5: A Handover Complete message is sent from the mobile unit to the BSC via the new base station.

Step S6: The BSC orders the old base station to release the old traffic channel. End of procedure.

Step S7: Has the maximum time passed for handover access bursts? If yes, go to step S8, if no, go to step S4.

Step S8: The mobile unit attempts to reconnect to the old base station.

Step S9: A handover failure message is transmitted from the mobile unit to the BSC via the old base station. End of procedure.

The step that is affected according to the invention, is step S3, in which the mobile unit transmits access bursts to the new base station.

According to the invention, the access bursts are stored in buffer memories and equalized and combined, to increase the chances of interpreting the received access bursts correctly. The equalization and combination is carried out before decoding.

Figure 6:
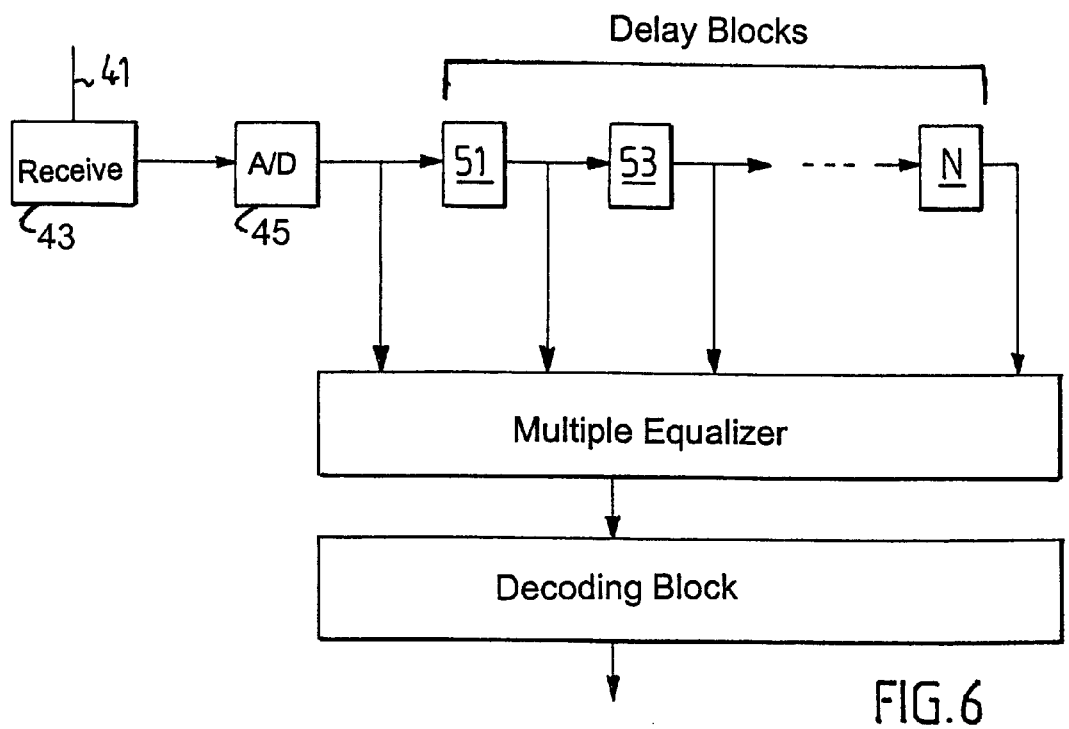
FIG. 6 is a block diagram of an apparatus according to a first embodiment of the invention.

FIG. 6 shows a general block diagram of the equipment needed in the receiver part of the base station to perform the method according to a first embodiment of the invention. The access bursts are received by an antenna 41 and passed on to a receiving block 43. The receiving block 43, may be implemented as several blocks performing different functions depending on the type of system. Typically, the receiving block 43 filters, amplifies and mixes the signal to a frequency applicable to the signal processing An analogue to digital (A/D) converter 45 is used in this case, for A/D conversion and sampling of the signals received from the receiving blocks 43. The A/D converter 45 can also add individual weights to each burst in dependence of the signal quality, for example, the signal to noise ratio. These weights, if present will be used later, in the equalization, combination and decoding steps.

An arbitrary number of delay blocks 51, 53, . . . ,N may be used to receive a number of bursts, which may be specified according to the type of system, and the type of communication. The first burst received is transmitted to a multiple equalizer 65 through a number of delay blocks 51, 53, . . . ,N, one less than the number of bursts to be combined. The second burst received is transmitted to the multiple equalizer 65 through the same delay blocks, except the last one. The last burst received is transmitted directly to the multiple equalizer 65. The number of access bursts to be combined may be selected freely but should be selected so that both decoding speed and decoding reliability are as high as possible.

When the specified number of bursts have been transmitted to the multiple equalizer 65, the bursts are equalized and combined, to form a more reliable piece of information. Different combination algorithms may be used, some of which will be described in more detail below. From the multiple equalizer 65 the signals are forwarded to a decoding block 67, and from there on the information is handled according to procedures known in the art.

The signals received are binary numbers, that is ones and zeros. As mentioned above, each one or zero is assigned a weight according to the quality of the received signal. Thus, the values fed to the multiple equalizer may have an arbitrary range, for example, 0–200 000. The weight may be assigned to a whole burst ("burst-wise") or to each individual bit ("bit-wise").

When payload information, or other information not received as repeated bursts, is received, the delay blocks 51, 53, . . . , N are not used. Instead the signal is fed directly to the multiple equalizer block 65.

Figure 7:
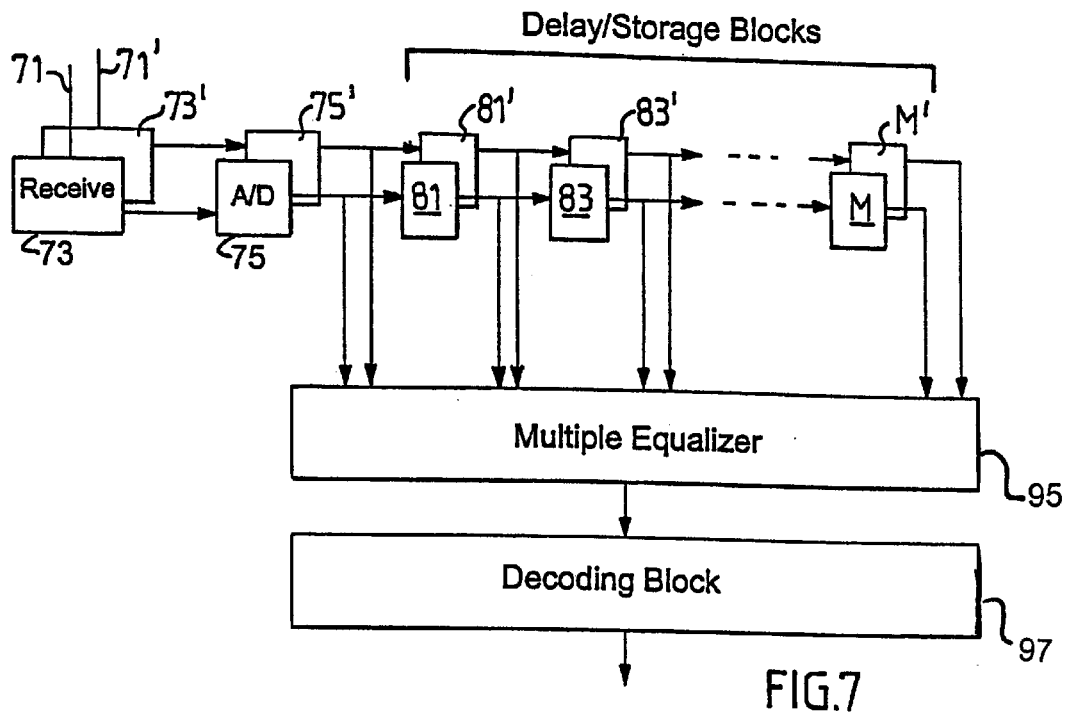
FIG. 7 is a block diagram of an apparatus according to a second embodiment of the invention.

FIG. 7 shows a block diagram of the equipment needed in the receiver part of the base station to perform the method according to a second embodiment of the invention. In this embodiment certain units are duplicated, in a way that is common, for example, in GSM systems. Each burst is received by two antennas 71, 71' and passed on to two receiving blocks 73 and 73', respectively. Two A/D converters 75, 75' convert the analogue signals to digital signals and feed the bursts to a multiple equalizer 95 in the same way as explained for FIG. 6. Both occurrences of the last burst are fed directly to the multiple equalizer 95, from the A/D converters 75, 75'. The two occurrences of all preceding bursts are fed to the multiple equalizer 95 from the A/D converters 75, 75' through delay blocks, or storage blocks, 81, 81', . . . , M, M', respectively.

When the appropriate number of bursts have been fed to the multiple equalizer 95, the multiple equalizer 95 combines both signals received by the two antennas 71, 71' and signals received at different times. From the equalizer 95 the signals are forwarded to a decoding block 97 and from this stage are handled in a way known in the art.

The antenna diversity combination, that is, the combination of the duplicated signal, can be carried out in a unit (not shown) before the delay blocks 81, 81', 83, 83' . . . , M, M', instead of in the equalizer 95. The delay blocks need then not be duplicated.

Depending on the type of signal received, it may be desirable to combine the information from more than one burst. For example, in packet switching, especially if the conditions are bad, each packet may be transmitted more than once, and the information from each occurrence of the same packet may be combined in the inventive way. Such an embodiment is independent of the type of access, that is, it is applicable to Time Division Multiple Access (TDMA), Frequency Division Multiple Access (FDMA) and Code Division Multiple Access (CDMA) systems.

Figure 8:
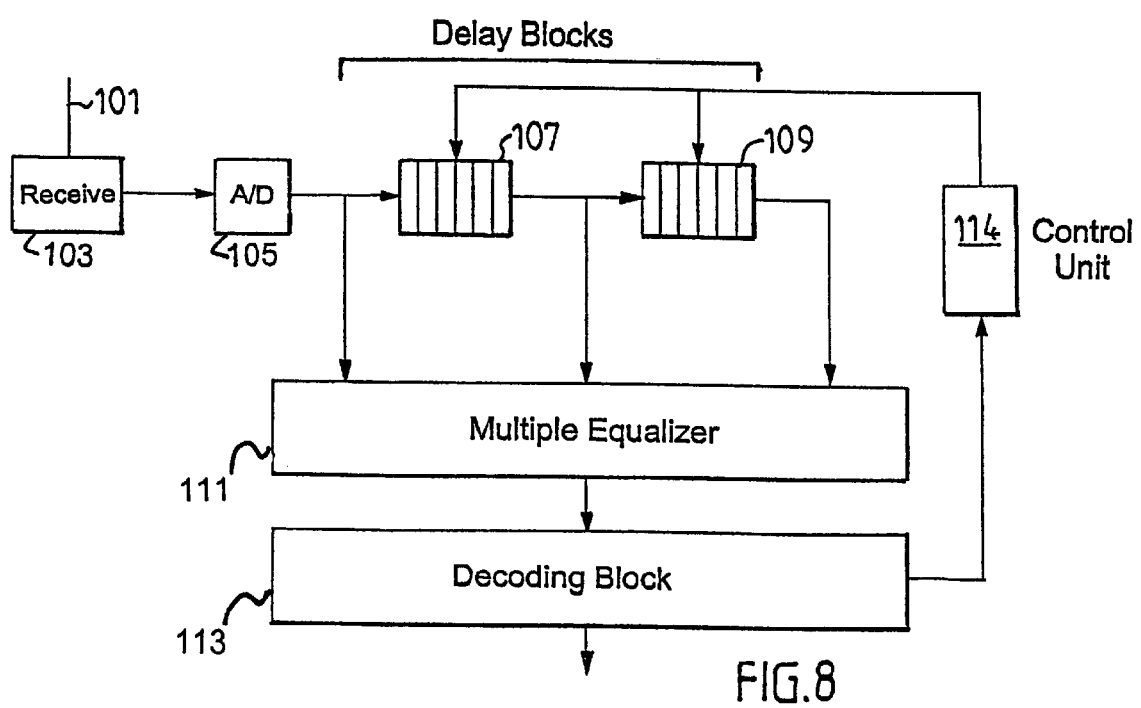
FIG. 8 is a block diagram of an apparatus according to a third embodiment of the invention.

FIG. 8 shows a block diagram of an apparatus for carrying out the method according to a third embodiment of the invention.

An antenna 101 receives the incoming signal bursts from a mobile unit (not shown) and forwards it to a first receiving block 103. The signal is then forwarded to an A/D converter 105.

Two delay blocks 107, 109 are shown, which means that three repetitions of the same information may be combined. Of course, as in the previous embodiments, the number of delay blocks 107, 109 may be selected freely.

To indicate that in this embodiment the identical bursts received may occur every six bursts, each of the delay blocks 107, 109 is shown with six compartments. As will be understood, an arbitrary number of bursts may be combined.

There is also a control unit 114 receiving information about the delay between the identical bursts from the decoder 113. The control unit 114 adjusts the delay blocks 107, 109 to allow the repetitions of a burst to be fed to the multiple equalizer 111 simultaneously. Thus, the system is able to handle variations in the delay between bursts. The control unit 114 can be, for example, a microprocessor.

The first occurrence of the information is transmitted from the A/D converter 105 to the multiple equalizer 111 through the first 107 and the second 109 delay block. The second occurrence is transmitted to the multiple equalizer 111 through the first delay block 107, and the third occurrence is transmitted directly to the multiple equalizer. In this way, all occurrences will be received in the multiple equalizer 111 simultaneously. After equalization and bit combination in the multiple equalizer 111, the resulting message is passed to a decoder 113 and from there on is handled in a manner known in the art The antenna 101, the first receiving unit 103, the A/D converter 105 and the delay blocks 107, 109 may be duplicated, in order to obtain, for example, antenna diversity.

According to one embodiment of the invention, the combination algorithm is based on a Maximum Ratio Combining (MRC) algorithm known in the art. (Jonas Karlsson and Jan Heinegard, "Interference Rejection Combining for GSM", ICUPC, Cambridge, Mass., USA, October, 1996.) According to this algorithm, each burst is equalized independently, by the Viterbi method and assigned quality values bitwise. The repeated and equalized bursts are added to each other to form a maximum ratio output.

The number of access bursts to be combined is selected. If three access bursts are to be combined, the first three access bursts are combined to form one output, the next three access bursts are combined to form a second output, etc. It is also possible to combine all access bursts to one output, if desired.

The burst combination described above for a base station can also be carried out in a mobile unit, which must then be equipped with buffer memories similar to block 51 in FIG. 6 or block 107 in FIG. 8, and with a multiple equalizer similar to the multiple equalizer block 65 shown in FIG. 6, the multiple equalizer block 95 shown in FIG. 7 or the multiple equalizer block 111 shown in FIG. 8.

What is claimed is:

1. A receiving device for receiving information transmitted by a transmitting device in a radio communications system in the form of repeated bursts comprising the same information but transmitted at different times, the receiving device comprising:

receiving means with a common antenna that receives the transmitted repeated bursts and processing means that receive the repeated bursts from the common antenna and process at least two of the received repeated bursts;

a delay means comprising at least one delay block arranged to enable simultaneous processing of the at least two received repeated bursts, each delay block arranged to delay at least one of the at least two repeated bursts by an amount of time corresponding to a predefined time difference between the bursts, a current received burst being passed through a number N of delay blocks, a next received burst being passed through a number N−1 of delay blocks; and equalizing and combining means for equalizing and combining the at least two received repeated bursts.

2. The receiving device according to claim 1, further comprising:

duplicated receiving means for duplicated reception of at least two repeated bursts;

duplicated storage means for storing at least one of the at least two repeated bursts; and equalizing and combining means for equalizing and combining the at least two repeated bursts provided by the duplicated receiving means.

3. The receiving device according to claim 1, further comprising:

decoding means for decoding the output from the equalizing and combining means; and control means for controlling the delay means depending on information received from the decoding means.

4. The receiving device according to claim 1, wherein the equalizing and combining means performs the combination according to a Maximum Ratio Combining algorithm.

5. The receiving device according to claim 1, further comprising means for assigning weights to the received signal depending on the signal quality.

6. The receiving device according to claim 5, wherein the weights are assigned bit-wise.

7. A receiving device according to claim 5, wherein the weights are assigned burst-wise.

8. A radio base station in a mobile telecommunications system, comprising at least one receiving device for receiving information transmitted by a transmitting device in a radio communications system in the form of repeated bursts comprising the same information but transmitted at different times, the receiving device comprising:

receiving means with a common antenna that receives the transmitted repeated bursts and processing means that receive repeated bursts from the common antenna, and process at least two of the received repeated bursts;

a delay means comprising at least one delay block arranged to enable simultaneous processing of the at least two received repeated bursts, each delay block arranged to delay at least one of the at least two repeated bursts by an amount of time corresponding to a predefined time difference between the bursts, a current received burst being passed through a number N of delay blocks, a next received burst being passed through a number N−1 of delay blocks; and equalizing and combining means for equalizing and combining the at least two received repeated bursts.

9. A radio terminal in a mobile telecommunications system, comprising at least one receiving device for receiving information transmitted by a transmitting device in the mobile telecommunications system in the form of repeated bursts comprising the same information but transmitted at different times, the receiving device comprising:

receiving means comprising a common antenna that receives the transmitted repeated bursts and processing means that receive the repeated bursts from the common antenna and process at least two of the received repeated bursts;

a delay means comprising at least one delay block arranged to enable simultaneous processing of the at least two received repeated bursts, each delay block arranged to delay at least one of the at least two repeated bursts by an amount of time corresponding to a predefined time difference between the bursts, a current received burst being passed through a number N of delay blocks, a next received burst being passed through a number N−1 of delay blocks; and equalizing and combining means for equalizing and combining the at least two repeated bursts.

10. A method of receiving information transmitted from a transmitting unit to a receiving unit in a radio communications network in the form of repeated bursts, each comprising the same information but transmitted at different times, the method comprising:

receiving, via a common antenna, and temporarily storing the repeated bursts;

selectively delaying each of the repeated bursts to enable the processing of the at least two received repeated bursts at the same time by passing a current burst received through a number N delay blocks, and a next burst through a number N−1 delay blocks, each delay block arranged to delay at least one of the at least two repeated bursts by an amount of time corresponding to a predefined time difference between the bursts;

equalizing and combining the information of at least two of the repeated bursts before decoding; and interpreting the equalized and combined information in the same way as the information of a single burst would be interpreted.

11. The method according to claim 10, further comprising combining the information of at least two repeated bursts by bitwise combination.

12. The method according to claim 10, further comprising combining the information of at least two repeated bursts using a Maximum Ratio Combining algorithm.

13. The method according to claim 10, further comprising assigning weights to the information depending on the quality of the information, said weights being used during the combining step.

14. The method according to claim 13, wherein the weights are assigned bit-wise.

15. The method according to claim 13, wherein the weights are assigned burst-wise.

* * * * *